United States Patent
Jardine et al.

(10) Patent No.: US 8,758,504 B2
(45) Date of Patent: Jun. 24, 2014

(54) DILUTION-STABLE CEMENT GRINDING ADDITIVE COMPOSITION

(75) Inventors: Leslie A. Jardine, Burlington, MA (US); Josephine H. Cheung, Lexington, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/825,908

(22) PCT Filed: Sep. 12, 2011

(86) PCT No.: PCT/US2011/051170
§ 371 (c)(1),
(2), (4) Date: Mar. 25, 2013

(87) PCT Pub. No.: WO2012/047450
PCT Pub. Date: Apr. 12, 2012

(65) Prior Publication Data
US 2013/0180434 A1    Jul. 18, 2013

Related U.S. Application Data

(60) Provisional application No. 61/386,621, filed on Sep. 27, 2010.

(51) Int. Cl.
C04B 24/10 (2006.01)
C04B 24/00 (2006.01)
C04B 24/12 (2006.01)
C04B 103/52 (2006.01)

(52) U.S. Cl.
USPC .......................... 106/804; 106/730; 106/823

(58) Field of Classification Search
USPC .......................... 106/730, 804, 823
See application file for complete search history.

(56) References Cited

U.S. PATENT DOCUMENTS

| | | | |
|---|---|---|---|
| 4,943,323 A | 7/1990 | Gartner et al. | |
| 5,017,234 A | 5/1991 | Gartner et al. | |
| 5,084,103 A | 1/1992 | Myers et al. | |
| 5,156,679 A | 10/1992 | Gartner et al. | |
| 6,213,415 B1 | 4/2001 | Cheung | |
| 6,290,772 B1 | 9/2001 | Cheung et al. | |
| 6,384,111 B1 | 5/2002 | Kistenmacher et al. | |
| 6,545,067 B1 | 4/2003 | Buchner et al. | |
| 7,160,384 B2 | 1/2007 | Jardine | |
| 7,462,236 B2 | 12/2008 | Chun et al. | |
| 8,097,666 B2 | 1/2012 | Macklin et al. | |
| 8,168,701 B2 | 5/2012 | Koyata et al. | |
| 2004/0072938 A1 | 4/2004 | Simonian | |
| 2004/0149172 A1* | 8/2004 | Jardine et al. | 106/724 |
| 2005/0257720 A1 | 11/2005 | Shendy et al. | |
| 2006/0280970 A1 | 12/2006 | Lettkeman et al. | |
| 2006/0281837 A1 | 12/2006 | Lettkeman et al. | |
| 2008/0057206 A1 | 3/2008 | Igo et al. | |
| 2009/0101045 A1 | 4/2009 | Lettkeman et al. | |
| 2009/0205824 A1 | 8/2009 | Sullivan et al. | |

FOREIGN PATENT DOCUMENTS

| | | |
|---|---|---|
| EP | 0415799 | 12/1994 |
| FR | 2600998 | 1/1988 |

OTHER PUBLICATIONS

PCT International Search Report (PCT/US 11/551170), [Jan. 2012].
PCT Written Opinion of International Searching Authority (PCT/US 11/551170), [Jan. 2012].

* cited by examiner

Primary Examiner — Anthony J Green
(74) Attorney, Agent, or Firm — Craig K. Leon

(57) ABSTRACT

The present invention provides cement grinding additive compositions and methods which allow a powerful, robust defoamer to be uniformly dispersed throughout a broad concentration range while retaining storage stability even in cases wherein the defoamer is highly diluted. Exemplary cement grinding additive compositions comprise at least one amine cement grinding additive; a tri-iso-butylphosphate defoamer; a biopolymer polysaccharide gum selected from the group comprising Diutan, Whelan, Xanthan, or mixtures thereof; and water in the amount of 0.10 to 95.0 percent based on total weight of composition. Methods for manufacturing cement using the cement grinding additive compositions are also described.

9 Claims, No Drawings

DILUTION-STABLE CEMENT GRINDING ADDITIVE COMPOSITION

FIELD OF THE INVENTION

This invention relates to additives for cement manufacture, and more particularly to a cement additive composition which can be formulated using dilute raw materials, before or after shipment to cement grinding manufacture plant, without tendency to destabilize defoamer.

BACKGROUND OF THE INVENTION

It is known to use a "day tank" at cement grinding plants where cement clinker is ground into finished cement product. So-called day tanks are containers in which the cement manufacturer adds water for the purpose of dispersing the grinding additive or perhaps for enhancing its pumpability.

The present inventors discovered that the practice of diluting cement grinding additives can create problems in circumstances wherein a desired defoamer package, contained within the grinding additive formulation, becomes destabilized and tends to separate when total solids concentration of the formulation falls below eighty percent (80%).

The present inventors desire to employ tri-iso-butylphosphate ("TIBP") as an air detraining agent (or "defoamer") due to recent commercial availability and due to what they have discovered is its relatively better ability, compared to its analogue tri-n-butylphosphate ("TNBP"), to resist structural degradation caused by harsh cement grinding mill temperatures and the mechanical grinding process itself.

However, the use of powerful defoamers, such as TIBP, renders it difficult to obtain a uniform distribution throughout the cement additive and resultant cement, particularly when total solids content of the cement additive composition falls below 80%, and especially as the concentrations must be minute. Thus, a novel composition and use of a cement additive having a powerful defoamer package with stable dilution characteristic are needed.

SUMMARY OF THE INVENTION

The present invention provides a storage-stable cement additive composition wherein small concentrations of a powerful defoamer is uniformly dispersed throughout the composition, as well as a method for detraining air in cement using the cement additive composition.

An exemplary cement grinding additive composition of the present invention comprises: (a) at least one amine cement grinding additive comprising triisopropanolamine, diethanolisopropanolamine, diisopropanolethanolamine, tetrahydroxyethylethylenediamine, tetrahydroxyisopropylethylenediamine, triethanolamine, methyldiethanolamine, diethanolamine, or mixtures thereof; (b) tri-iso-butylphosphate (O=P[OCH$_2$CH(CH$_3$)$_2$]$_3$); (c) a biopolymer polysaccharide gum comprising Diutan, Whelan, Xanthan, or mixtures thereof (and most, preferably, Diutan or Whelan); and (d) water in amount of 0.10 to 95.0 percent based on total weight of the cement grinding additive composition, whereby tri-iso-butylphosphate is uniformly disbursed throughout the cement additive composition.

An exemplary method of the present invention for manufacturing cement comprises: introducing to cement clinker, before or during the grinding thereof to produce hydratable cement, the afore-mentioned cement additive composition.

A primary advantage of the invention is that the cement grinding additive compositions can have a wider-ranging water content (0.10% to 95.0%); this means that the cement manufacturers may use the additive product in concentrated form or otherwise in a highly diluted form as described in the background without destabilizing the cement additive-TIBP defoamer system.

Further embodiments of the invention are described in further detail hereinafter.

DETAILED DESCRIPTION OF EXEMPLARY EMBODIMENTS

The cement additive compositions and methods of the present invention may be used with or in conventional grinding mills, such as ball mills (or tube mills). The present inventors also believe that they can be applied in mills employing rollers (e.g., vertical rollers, rollers on tables, etc.). See e.g., U.S. Pat. No. 6,213,415 of Cheung. The cement grinding additive compositions are believed to withstand grinding temperatures which can be in the range of 50 to 150 degrees Celcius.

The term "cement" as used herein includes hydratable Portland cement which is produced by pulverizing clinker consisting of hydraulic calcium silicates and one or more forms of calcium sulfate (e.g., gypsum) as an interground additive. The term "cementitious" as used herein refers to materials that comprise Portland cement or which otherwise function as a binder to hold together fine aggregates (e.g., sand), coarse aggregates (e.g., crushed gravel), or mixtures thereof.

Included in the definition of cement and cementitious materials, and often referred to as supplemental cementitious materials, are fly ash, granulated blast furnace slag, limestone, natural pozzolans, or mixtures thereof. Typically, Portland cement is combined with one or more other cementitious materials, such as the foregoing supplemental cementitious materials, and provided as a blend. The cement additive composition and method of the present invention, however, can be used separately for grinding Portland cement, or any of the other cementitious materials, independently or in any combination.

The term "hydratable" as used herein is intended to refer to cement and/or cementitious materials that are hardened by chemical interaction with water. Portland cement clinker is a partially fused mass primarily composed of hydratable calcium silicates. The calcium silicates are essentially a mixture of tricalcium silicate (3CaO.SiO$_2$ "C$_3$S" in cement chemists notation) and dicalcium silicate (2CaO.SiO$_2$, "C$_2$S") in which the former is the dominant form, with lesser amounts of tricalcium aluminate (3CaO.Al$_2$O$_3$, "C$_3$A") and tetracalcium aluminoferrite (4CaO.Al$_2$O$_3$.Fe$_2$O$_3$, "C$_4$AF"). See e.g., Dodson, Vance H., *Concrete Admixtures* (Van Nostrand Reinhold, New York N.Y. 1990), page 1.

As described in the summary section above, cement grinding additive composition and methods of the invention involve the use of the following components.

Exemplary grinding additive compositions and methods of the invention contain at least one amine cement grinding additive which comprises triisopropanolamine, diethanolisopropanolamine, diisopropanolethanolamine, tetrahydroxyethylethylenediamine, tetrahydroxyisopropylethylenediamine, triethanolamine, methyldiethanolamine, diethanolamine, or mixtures thereof. Of these, triisopropanolamine (TIPA) is preferred. The use of TIPA should be in the amount of up to 0.2% based on weight of cement clinker, and is preferably used in combination with triethanolamine (TEA), as described in European Patent No. 0 415 799 B1, owned by the common assignee hereof. Another preferred combination is tetrahydroxyethylethylenediamine (THEED) with TEA, as disclosed in U.S. Pat. No. 7,160,384, also owned by the common assignee hereof. The one or more amine cement grinding additives may be present in an amount of 1.0 to 99.0 percent based on total weight of the cement grinding additive composition.

Exemplary cement grinding additive compositions and methods of the invention also involve the use of tri-iso-butylphosphate (TIBP) which may be represented by the structural formula

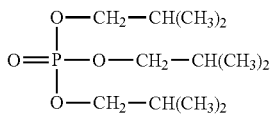

Preferably, TIBP is present in an amount of 0.05 to 5.0 percent, and more preferably in the range of 0.4% to 3.0%, based on total weight of the cement grinding additive composition. In most preferred cement grinding additive compositions and methods of the invention, the weight ratio of the amine cement grinding additive component to the TIBP defoamer component is 100:2 to 100:10 based on dry solids weight; and, most preferred, the weight ratio is 100:5 to 100:10.

In further exemplary cement grinding additive compositions and methods of the invention, TIBP can be used optionally with glycol cement grinding additives such as diethylene glycol (DEG) and monoethylene glycol (MEG). The inventors believe that DEG and MEG can provide some strength-enhancement when combined with TIBP used as a defoamer (air-detraining) agent and that such glycols can be used in conventional amounts as known in the art. Hence, further exemplary cement grinding additive compositions and methods of the invention further comprise at least one glycol cement grinding additive component.

Exemplary cement grinding additive compositions and methods of the invention further involve the use of a biopolymer polysaccharide selected from the group consisting of Diutan gum (S-657), Whelan gum, and Xanthan gum. Diutan and Whelan are more preferred, and Diutan most preferred. The biopolymer polysaccharide is preferably used in an amount of 0.01 to 1.0 percent, and more preferably 0.1 percent to 0.3 percent, based on total weight of the cement grinding additive composition.

Finally, exemplary compositions and methods of the invention further involve the use of water, which should be present in an amount of 0.10 to 95.0 percent, and more preferably 20.0 to 60.0 percent, based on total weight of the cement grinding additive composition. This means that the invention covers concentrated forms wherein the cement grinding additive composition is nearly water-free, such that it would not allow for solubilization or complete solubilization of the gum, such that the product can be shipped to the cement manufacturer customer with a low viscosity. The customer (cement manufacturer) can subsequently add water to dilute the product in "day tanks" at which point the cement additive formulation would remain stable.

Preferably, the viscosity of exemplary cement grinding additive compositions of the invention should be 50-5000 centipoise ("cp"), and more preferably in the range of 100-3000 cp, as measured at 20 degrees Celcius (Brookfield viscometer; spindle 27, 3 rpm).

Preferred cement grinding additive compositions of the invention should have a storage stability, or ability to resist physical separation of components. For example, if placed into a conventional vessel such as glass beaker, glass test tube, or more preferably a separatory funnel, exemplary cement grinding additive compositions of the invention should display a homogeneity or uniformity of TIBP dispersal within the entire volume of the composition wherein the average concentrations of TIBP between the top and bottom one-third fractions of the vessel should not differ by more than 20%; more preferably they should not differ by more than 10%; and, most preferably, they should not differ by more than 5%, when stored at 100 degrees Fahrenheit for 10 days. The concentration of TIBP may be confirmed by using standard test methods (e.g., high performance liquid chromatography).

It is contemplated that certain conventional grinding additive components may be incorporated into the exemplary cement grinding additive compositions of the present invention. In addition to glycols which were previously mentioned above, further exemplary compositions of the invention may include acetic acid or acetate, salts (e.g., sodium chloride, calcium chloride, calcium nitrite, calcium nitrate, sodium gluconate), and sugars (e.g., corn syrup, molasses, citric acid, sucrose), all of which may be used in percentages as known to those of ordinary skill.

As summarized above, an exemplary method of the present invention for manufacturing cement comprises introducing to cement clinker, before or during the grinding thereof to produce hydratable cement, the afore-mentioned storage stable cement additive composition comprising (a) at least one amine cement grinding additive comprising triisopropanolamine, diethanolisopropanolamine, diisopropanol-ethanolamine, tetrahydroxyethyl-ethylenediamine, tetrahydroxyisopropyl-ethylenediamine, triethanolamine, methyldiethanolamine, diethanolamine, or mixtures thereof; (b) tri-iso-butylphosphate; (c) a biopolymer polysaccharide gum selected from the group consisting of Diutan, Whelan, and Xanthan; and (d) water, the components (a) through (d) being present in accordance in the ranges described above, whereby tri-iso-butylphosphate is uniformly disbursed throughout the cement grinding additive composition.

Cements produced by the exemplary processes of the invention are expected to have reduced air content, when water is added to hydrate the cement, in comparison to cement clinker that has been ground the same amount (to the same extent) and that has the same amount of amine grinding additive but without the TIBP present.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

EXAMPLE 1

The following cement grinding additive compositions were made in accordance with the following formulations, all percentages being based on the total weight of the composition.

Formulation Sample #5840-80-A: Triisopropanolamine (85% solution) (hereinafter "TIPA85") (42.4%); water (42.9%); and acetic acid (14.7%).

Formulation Sample #5840-81A: TIPA85 (42.1%); Tri-iso-butylphosphate (hereinafter "TIBP") (1.8%); Diutan gum (0.25%); water (41.1%); and acetic acid (14.7%).

Formulation Sample #5840-81B: TIPA85 (42.1%); TIBP (1.8%); Diutan gum (0.1%); water (41.1%); and acetic acid (14.7%).

Formulation Sample #5840-81C: TIPA85 (42.4%); TIBP (1.8%); water (41.1%); and acetic acid (14.7%).

The forgoing formulation samples 5840-81A, 5840-81B, and 5840-81C were stored in separatory funnels for 3 days at 108 degrees Fahrenheit in an attempt to accelerate separation of the TIBP within the samples. The samples were then each divided into thirds, isolating the bottom third fraction, middle third fraction, and top third fraction of the material in the separatory funnels.

The nine isolated one-third fractions (for formulation samples 5840-81A, 5840-81B, and 5840-81C) were then evaluated for TIBP content using high performance liquid chromatography (HPLC). HPLC conditions included use of XTERRA™ columns (4.6×250 mm part no. 186000496); mobile phase: methanol/water=80/20; flow rate 0.8 ml. per min.; Detector: RI, Sensitivity 16, Scale Factor 20).

Non-separated fractions ("retains") of each of formulation samples 5840-81A, 5840-81B, and 5840-81C were also tested for reference. For formulations 5840-81A and 58440-81B, containing 0.25% and 0.1% Diutan gum, respectively, TIBP content was very close to the expected 1.8%, indicating no material separation.

For formulation sample 5840-81C, however, almost no TIBP was detected in the bottom and middle third fractions of the sample. All of the TIBP was found in the top third fraction, suggesting that the TIBP separated and floated to the top of the composition. The detected value of 14% in the top sample fraction and 5.3% in the non-separated retain fractions were higher than expected. In the formulation sample that did not contain the biopolymer gum, TIBP separated immediately from the other ingredients, rendering homogenous sampling impossible. These deviations from the expected values of 5.2% and 1.8%, respectively, were likely due to sampling of non-homogeneous material.

Results are summarized in Table 1 below.

TABLE 1

| | TIBP expected in formula (%) | TIBP detected in sample (%) - 3 days |
|---|---|---|
| Formulation 5840-81A (0.25% Diutan Gum, 1.8% TIBP) | 1.8 | 2.1 |
| Top fraction | 1.8 | 1.8 |
| Middle fraction | 1.8 | 1.9 |
| Bottom fraction | 1.8 | 1.9 |
| Formulation 5840-81B (0.1% Diutan Gum, 1.8% TIBP) | 1.8 | 2.1 |
| Top fraction | 1.8 | 1.8 |
| Middle fraction | 1.8 | 2.0 |
| Bottom fraction | 1.8 | 2.0 |
| Formulation 5840-81C (No Diutan Gum, 1.8% TIBP) | 1.8 | 5.3 |
| Top fraction | 1.8 | 14.0 |
| Middle fraction | 1.8 | 0.1 |
| Bottom fraction | 1.8 | 0.1 |

EXAMPLE 2

Several of the foregoing formulations were evaluated for their effect on air entrainment in cement mortar prepared according to ASTM C185-02.

An ordinary Portland cement was used. Each additive was added at 0.04% based on the weight of cement. Air was effectively controlled, in all formulation samples that contained the defoamer with biopolymer polysaccharide gum, to a level at or below the level of the reference mortar sample that was prepared without additive. The bottom fraction of Formulation Sample 5840-81C, from which the defoamer had separated out (by floating to the top third fraction) demonstrated an air content as high as the formulation sample without defoamer.

Results are summarized in Table 2 below.

TABLE 2

| | TIBP expected in formula (%) | TIBP detected in sample (%) - 3 days | Air % for 3 day samples |
|---|---|---|---|
| Mortar prepared with no additive | | | 9.0 |
| Formulation 5840-80-A (No defoamer, no Gum) | 0 | 0.0 | 10.2 |
| Formulation 5840-81C Top fraction | 1.8 | 14.0 | 8.6 |
| Formulation 5840-81C Bottom fraction | 1.8 | 0.1 | 10.1 |
| Formulation 5840-81A Top fraction | 1.8 | 1.8 | 8.8 |
| Formulation 5840-81A Bottom fraction | 1.8 | 1.9 | 7.7 |
| Formulation 5840-81B Top fraction | 1.8 | 1.8 | 7.4 |
| Formulation 5840-81B Bottom fraction | 1.8 | 2.0 | 8.6 |

EXAMPLE 3

The following cement grinding additive compositions were made in accordance with the following formulations, all percentages being based on the total weight of the composition.

Formulation Sample 5840-88A: TIPA85 (42.4%); water (42.9%); and acetic acid (14.7%).

Formulation Sample 5840-88B: TIPA85 (42.4%); Tri-iso-butylphosphate (hereinafter "TIBP") (1.8%); Whelan Gum (0.1%); water (40.9%); and acetic acid (14.8%).

Formulation Sample 5840-88C: TIPA85 (42.4%); Tri-iso-butylphosphate (hereinafter "TIBP") (1.8%); Whelan Gum (0.17%); water (40.9%); and acetic acid (14.8%).

Formulation samples 5840-88B and 5840-88C were stored in separatory funnels for 11 days at 120 degrees Fahrenheit to see if separation would occur. Each of the formulation samples were then divided into three fractions, isolating the bottom one-third, middle one-third, and top one-third fractions of the material in the funnels. The six isolated one-third fractions were evaluated for their TIBP content by HPLC. While the measured TIBP level was slightly lower than the expected level, the top, middle, and bottom fractions had comparable levels of TIPB. All of these values are an average of two measured values for each sample. The pooled standard deviation was 0.037% TIBP, with 6 degrees of freedom. Measured values may differ from expected values.

Results are summarized in Table 3 below.

TABLE 3

|  | TIBP expected in formula (%) | TIBP detected in sample (%) - 11 days |
|---|---|---|
| Formulation Sample 5840-88B (0.1% Whelan, 1.8% TIBP) | | |
| Top fraction | 1.8 | 1.72 |
| Middle fraction | 1.8 | 1.70 |
| Bottom fraction | 1.8 | 1.69 |
| Formulation Sample 5840-88C (0.17% Whelan, 1.8% TIBP) | | |
| Top fraction | 1.8 | 1.72 |
| Middle fraction | 1.8 | 1.71 |
| Bottom fraction | 1.8 | 1.73 |

EXAMPLE 4

Again, several of these samples were also evaluated for their effect on air entrainment in cement mortar prepared according to ASTM C185-02. An ordinary Portland cement was used. Each additive was added at 0.04% based on the weight of cement. Air was effectively controlled to an amount below or at the level of the reference mortar that was prepared without additive.

Results are summarized in Table 4.

TABLE 4

|  | TIBP expected in formula (%) | TIBP detected in sample (%) - 11 days | Air % for 11 day samples |
|---|---|---|---|
| Mortar prepared with no additive | | | 8.2 |
| Formulation Sample 5840-88-A No defoamer, no Diutan Gum | 0 | | 9.5 |
| 5840-88B Top fraction | 1.8 | 1.72 | 7.8 |
| 5840-88B Middle Fraction | 1.8 | 1.70 | 7.2 |
| 5840-88B Bottom Fraction | 1.8 | 1.69 | 7.4 |
| 5840-88C Top fraction | 1.8 | 1.72 | 7.0 |
| 5840-88C Middle Fraction | 1.8 | 1.71 | 6.4 |
| 5840-88C Bottom Fraction | 1.8 | 1.73 | 7.5 |

EXAMPLE 5

Further formulation samples were prepared. In one, Xanthan gum was used (formulation sample 5840-78G). In another, Diutan gum was used (formulation sample 5840-78E). Both formulations were stored at 72 degrees Fahrenheit for 21 days in graduated cylinders.

Formulation Sample 5840-78G: TIPA85 (42.2%); TIBP (1.8%); Xanthan gum (KELZN ASX) (0.7%); water (40.6%); and acetic acid (14.7%).

Formulation Sample 5840-78F: TIPA85 (42.5%); TIBP (1.8%); Diutan gum (0.35%); water (40.8%); and acetic acid (14.7%).

The bottom one-third of each sample was isolated and evaluated for its effect on air entrainment in cement mortar prepared according to ASTM C185. An ordinary Portland cement was used. Each additive was added at 0.04% based on the weight of cement. Xanthan gum was not as effective in stabilizing defoamer. Diutan gum was effective in stabilizing defoamer TIBP at half the dosage.

Results are shown in Table 5 below.

TABLE 5

|  | ASTM C185 Air(%) for samples stored 21 days |
|---|---|
| Mortar prepared with no additive | 8.9 |
| Formulation Sample 5840-80-A (No defoamer, no Diutan Gum) | 10.9 |
| Formulation Sample 5840-78G Bottom Fraction | 10.0 |
| Formulation Sample 5840-78F Bottom Fraction | 7.5 |

EXAMPLE 6

Viscosifying agent hydroxyethyl methyl cellulose MW 40,000 was used in the following formulation (5840-78H).

Formulation Sample 5840-78H: TIPA85 (42.4%); TIBP (1.8%); hydroxyethyl methyl cellulose (WALLOCEL™ 40,000) (0.5%); water (40.6%); and acetic acid (14.7%).

This formulation visibly separated after one day of storage.

EXAMPLE 7

Formulations samples 5840-84A and 5840-84B were prepared with lower levels of Diutan gum than previously used and tested. These samples had visibly separated after 3 days of storage at 108 degrees Fahrenheit. With the previous data for comparison, this suggested that the minimum level of 0.05-0.25% Diutan gum was required to maintain stability of the TIBP defoamer in this particular formulation.

Formulation sample 5840-84A: TIPA85 (42.4%); TIBP (1.8%); Diutan gum (0.05%); water (40.8%); and acetic acid (14.7%).

Formulation sample 5840-84B: TIPA85 (42.4%); TIBP (1.8%); Diutan gum (0.025%); water (40.8%); and acetic acid (14.7%).

EXAMPLE 8

The following formulations of TIBP in water with various gums were prepared and tested for viscosity. The gums were dispersed in TIBP prior to the introduction of water. Formulations were stored in separatory funnels for 10 days at 100 F. Samples were then divided into three fractions, isolating the bottom one-third, middle one-third, and top one-third fractions in the funnels for each formulation. The isolated fractions were evaluated for their TIBP content by HPLC. Both Diutan gum and Whelan gum are preferred agents for stabilizing TIBP. Xanthan gum is less preferred. While the higher level of 0.45% begins to provide some stability for TIBP, increasing the level further may adversely affect the pumping viscosity of additives in application.

A non-separated retain of the sample with 0.15% Diutan gum was found to have 3.4% TIBP by HPLC.

TABLE 6

| Gum Component | Diutan % | Diutan % | Whelan % | Whelan % | Xanthan % | Xanthan % |
|---|---|---|---|---|---|---|
| TIBP | 3.6% | 3.6% | 3.6% | 3.6% | 3.6% | 3.6% |
| VMA | 0.15% | 0.30% | 0.30% | 0.45% | 0.30% | 0.45% |
| Water | 96.2% | 96.1% | 96.1% | 95.9% | 96.1% | 95.9% |
| Brookfield viscosity Average of spindle 27 and 34 | | | | | | |
| RPM | CP | CP | CP | CP | CP | CP |
| 0.3 | 18420 | 21340 | 10922 | 18420 | 13105 | 16315 |
| 3 | 2237 | 2677 | 2411 | 3572 | 2674 | 3847 |
| 12 | 658 | 738 | 834 | 1200 | 904 | 1270 |
| 30 | 286 | 315 | 415 | 576 | 439 | 603 |
| 60 | 158 | 168 | 240 | 329 | 263 | 350 |
| Storage for 10 days at 100-108 F. | | | | | | |
| Fraction | % TIBP | % TIBP | % TIBP | % TIBP | % TIBP | % TIBP |
| Top | 3.3 | 3.4 | 3.5 | 3.2 | 9.0 | 3.4 |
| Middle | 3.2 | 3.3 | 3.4 | 3.2 | 0.1 | 1.7 |
| Bottom | 3.1 | 3.5 | 3.2 | 3.2 | 0.1 | 1.2 |

EXAMPLE 9

Samples were formulated using carboxylmethyl cellulose (WALLOCEL™ 40,000) in amounts up to 5% in the formulation. Visible separation occurred, suggesting that carboxylmethyl cellulose did not stabilize the TIBP within the formulation.

EXAMPLE 10

The following formulations of TIBP/Glycol/water and various amines were prepared. This purpose of this test was to determine whether TIBP could be stabilized in formulations with amines other than TIPA. TIPA has a solubilizing effect on TIBP, and can stabilize TIBP in formulations with total solids greater than 80%. The same is not observed when these other amines are used in high solids formulations with TIBP. Separation occurs. Formulations were stored in separatory funnels for 10 days at 100 degrees Fahrenheit. Samples were then divided into three fractions, isolating the bottom one-third, middle one-third, and top one-third fractions of the material in separatory funnels. The isolated fractions were evaluated for their TIBP content using HPLC. It was confirmed that, regardless of which amine was used in the formulation, the amount of TIBP in each fraction was comparable, indicating a stabilization of TIBP in the formulation. Results are shown in Table 7 below.

TABLE 7

| AMINE component | DEIPA % | THEED % | TEA % |
|---|---|---|---|
| TIBP | 1.2% | 1.2% | 1.2% |
| Diutan gum | 0.17% | 0.17% | 0.17% |
| Glycol | 35% | 35% | 35% |
| Amine | 25% | 25% | 25% |
| water | 39% | 39% | 39% |
| Storage for 10 days at 100-108° F. | | | |
| Fraction | % TIBP | % TIBP | % TIBP |
| top | 1.1 | 1.0 | 1.1 |
| middle | 1.1 | 1.1 | 1.1 |
| bottom | 1.1 | 1.1 | 1.1 |

The foregoing examples and embodiments were presented for illustrative purposes only and not intended to limit the scope of the invention.

What is claimed is:

1. A cement grinding additive composition, comprising:
   (a) at least one amine cement grinding additive comprising triisopropanolamine, diethanolisopropanolamine, diisopropanolethanolamine, or mixtures thereof; and
   (b) tri-iso-butylphosphate present in an amount of 0.05 to 5.0 percent based on total weight of said cement grinding additive composition, said tri-iso-butylphosphate being represented by the formula

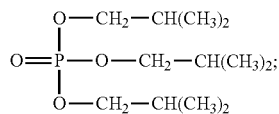

(c) a biopolymer polysaccharide gum present in an amount of 0.05 to 1.0 percent based on total weight of said cement grinding additive composition, said biopolymer polysaccharide gum being selected from the group consisting of Diutan, welan, and Xanthan; and
   (d) water in amount of 35 to 95.0 percent based on total weight of the cement grinding additive composition, whereby said tri-iso-butylphosphate is uniformly disbursed throughout said cement grinding additive composition, whereby, if said cement grinding additive composition were placed in a vessel, said tri-iso-butylphosphate displays uniformity of tri-iso-butylphosphate dispersal within the entire volume of the composition wherein the average concentrations of tri-iso-butylphosphate between the top and bottom one-third fractions of the vessel should not differ by more than 20%, when stored at 100 degrees Fahrenheit for 10 days.

2. The cement grinding additive composition of claim 1 wherein said biopolymer polysaccharide gum is selected from Diutan and welan.

3. The cement grinding additive composition of claim 1 wherein said biopolymer polysaccharide gum is Diutan.

4. The cement grinding additive composition of claim 3 further comprising diethylene glycol, monoethylene glycol, or mixture thereof.

5. The cement grinding additive composition of claim 1 further comprising a cement grinding aid selected from a glycol, acetic acid or acetate, salt, sugar, or mixtures thereof.

6. The cement grinding additive composition of claim 5 further comprising a glycol.

7. Method for manufacturing cement comprising: introducing to cement clinker, before or during the grinding thereof to produce hydratable cement, the composition of claim 1.

8. Method for manufacturing cement comprising: introducing to cement clinker, before or during the grinding thereof to produce hydratable cement, the composition of claim 5.

9. Method for manufacturing cement comprising: introducing to cement clinker, before or during the grinding thereof to produce hydratable cement, the composition of claim 6.

* * * * *